United States Patent
Shin et al.

(10) Patent No.: US 9,291,470 B2
(45) Date of Patent: Mar. 22, 2016

(54) APPARATUS AND METHOD FOR PROVIDING ROUTE GUIDANCE BASED ON EMOTION

(71) Applicant: Electronics and Telecommunications Research Institute, Daejeon (KR)

(72) Inventors: Hyun-Soon Shin, Daejeon (KR); Yong-Kwi Lee, Daejeon (KR); Jun Jo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 8 days.

(21) Appl. No.: 14/206,852

(22) Filed: Mar. 12, 2014

(65) Prior Publication Data
US 2014/0309933 A1    Oct. 16, 2014

(30) Foreign Application Priority Data
Apr. 12, 2013   (KR) .......................... 10-2013-0040388

(51) Int. Cl.
*G01C 21/34* (2006.01)
*G01C 21/36* (2006.01)

(52) U.S. Cl.
CPC ........ *G01C 21/3484* (2013.01); *G01C 21/3407* (2013.01); *G01C 21/3617* (2013.01)

(58) Field of Classification Search
CPC ........... G01C 21/3617; G01C 21/3484; G01C 21/3407; G01C 21/367
USPC .......................................................... 701/533
See application file for complete search history.

(56) References Cited

U.S. PATENT DOCUMENTS

| | | | |
|---|---|---|---|
| 2011/0118969 A1* | 5/2011 | Krishnaswamy | 701/200 |
| 2012/0150429 A1* | 6/2012 | Siotos | 701/411 |

FOREIGN PATENT DOCUMENTS

| | | |
|---|---|---|
| KR | 10-2012-0078130 | 7/2012 |
| KR | 10-2012-0086579 | 8/2012 |

* cited by examiner

*Primary Examiner* — Fadey Jabr
*Assistant Examiner* — Yazan A Soofi
(74) *Attorney, Agent, or Firm* — Nelson Mullins Riley & Scarborough LLP; Anthony A. Laurentano; Michael Malone

(57) ABSTRACT

An apparatus and method are disclosed for providing route guidance based on emotion. The apparatus includes an emotion information acquisition unit, a route information calculation unit, and a route guidance unit. The emotion information acquisition unit obtains information about a user's emotion using an emotion acquisition sensor. The route information calculation unit calculates emotion route information using the obtained emotion information and map information. The route guidance unit provides route guidance to the user using the calculated emotion route information.

18 Claims, 5 Drawing Sheets

APPARATUS AND METHOD FOR PROVIDING ROUTE GUIDANCE BASED ON EMOTION

CROSS REFERENCE TO RELATED APPLICATION

This application claims priority to and the benefit of Korean Patent Application No. 10-2013-0040388, filed on Apr. 12, 2013, which is hereby incorporated by reference in its entirety into this application.

BACKGROUND OF THE INVENTION

1. Technical Field

The present invention relates generally to an apparatus and method for providing route guidance based on emotion and, more particularly, to an apparatus and method for providing route guidance based on emotion, which are capable of providing route guidance in accordance with a user's emotion and perform route guidance that helps to improve the user's emotion, thereby improving the quality of life.

2. Description of the Related Art

Recently, an interest in helper technology for improving the quality of life has rapidly increased. In particular, even in a vehicle that is a necessity in modern life, an interest in route guidance technology for improving the quality of life has rapidly increased.

In a common route guidance technology, a route is calculated by taking into account only the current position and destination of a vehicle, and then guidance related to the calculated route is provided. In a route guidance technology for improving the quality of life, it is an important factor to provide a route desired by a user in addition to a route in which only a current position and destination of a vehicle have been taken into account.

Korean Patent Application Publication No. 2012-0078130 is directed to a route provision method and a recording medium, and discloses a route guidance technology based on the type of vehicle, in which information about a vehicle is received, the type of vehicle is determined based on the information, a passable route is determined based on the type of vehicle, and route guidance related to a route calculated within the passable route is provided.

Furthermore, Korean Patent Application Publication No. 2012-0086579 is directed to a learning-type route provision method for a car navigation system, and discloses a learning-type route guidance technique for performing user-tailored route guidance, in which a car navigation system calculates a route, provides the calculated route to the user, gathers statistics of route information corresponding to a re-calculation section while newly calculating a route if the user deviates from the route during the route guidance, and incorporates the gathered statistics into the calculation of a next route.

However, these conventional route guidance technologies disclose only the type of vehicle and the deviation of the user from a route, that is, factors that are considered when a route is calculated, but do not disclose a technology in which the user's emotion is taken into account. Furthermore, with regard to the presentation of a calculated route, the conventional route guidance technologies do not disclose or suggest a detailed technology for performing route guidance related to a preferred route if the user has selected a route or performing route guidance corresponding to changed emotion if there is a change in the user's emotion. Moreover, the conventional route guidance technologies do not disclose or suggest a technology for providing audio, video, and lighting corresponding to the user's emotion in addition to the route guidance, thereby performing route guidance that helps to improve the user's emotion, together with route guidance that has been tailored to the user's emotion.

Accordingly, with regard to a route guidance technology for improving the quality of life, there is an urgent need for a new route guidance technology for obtaining information about a user's emotion, providing an emotion route to the user using the information, providing route guidance related to a preferred route if the user has selected a route or providing route guidance corresponding to the change in emotion if there is a change in the user's emotion, and providing audio, video, and lighting corresponding to the user's emotion in addition to the route guidance, thereby performing route guidance that helps to improve the user's emotion, together with route guidance that has been tailored to the user's emotion.

SUMMARY OF THE INVENTION

Accordingly, the present invention has been made keeping in mind the above problems occurring in the prior art, and an object of the present invention is to obtain information about a user's emotion using an emotion acquisition sensor that is held by the user or included in a vehicle in which the user has ridden and then provide the user with an emotion route using the information about the user's emotion, thereby providing route guidance tailored to a user's emotion.

Another object of the present invention is to update preferred route information if a user has selected a route and provide route guidance related to a preferred route if the user has not selected a route, thereby compiling statistical information about preferred routes based on the user's emotion and then providing user-tailored route guidance.

Yet another object of the present invention is to perform route guidance corresponding to changed emotion if there is a change in a user's emotion during route guidance, thereby providing route guidance tailored to a user's emotion.

Further yet another object of the present invention is to provide audio, video, and lighting corresponding to the user's emotion in addition to the route guidance, thereby performing route guidance that helps to improve the user's emotion, together with route guidance that has been tailored to the user's emotion.

In accordance with an aspect of the present invention, there is provided an apparatus for providing route guidance based on emotion, including an emotion information acquisition unit configured to obtain information about a user's emotion using an emotion acquisition sensor; a route information calculation unit configured to calculate emotion route information using the obtained emotion information and map information; and a route guidance unit configured to provide route guidance to the user using the calculated emotion route information.

The route guidance unit may provide the user with emotion routes included in the emotion route information, and may check whether the user has selected a route.

If the user has selected a route, the route guidance unit may provide route guidance related to the emotion route corresponding to the selected route, and may store the emotion route and the emotion information in a pair as preferred route information.

If the user has not selected a route, the route guidance unit may provide route guidance related to the emotion route corresponding to the emotion information using the stored preferred route information.

The emotion information acquisition unit may obtain information about the user's emotion in real time during the route guidance, and may determine whether there is a change in the user's emotion.

If there is a change in the user's emotion, the route information calculation unit may calculate new emotion route information again using the emotion information and the map information.

If there is a change in the user's emotion, the route guidance unit may provide the user with the emotion routes included in the calculated new emotion route information, and may determine whether the user has selected the route again.

If the user has selected the route again, the route guidance unit may provide route guidance related to the emotion route corresponding to the reselected route, and may store the emotion route and the emotion information in a pair as the preferred route information.

If the user has not selected the route again, the route guidance unit may provide route guidance related to the emotion route corresponding to the emotion information using the previously stored preferred route information.

The route guidance unit may provide the user with one or more of audio, video, and lighting corresponding to the emotion information while providing the route guidance.

In accordance with another aspect of the present invention, there is provided a method for providing route guidance based on emotion, including obtaining information about a user's emotion using an emotion acquisition sensor; calculating emotion route information using the obtained emotion information and map information; and providing route guidance to the user using the calculated emotion route information.

Providing the route guidance may include providing the user with emotion routes included in the emotion route information and checking whether the user has selected a route.

Providing the route guidance may include, if the user has selected a route, providing route guidance related to the emotion route corresponding to the selected route and storing the emotion route and the emotion information in a pair as preferred route information.

Providing the route guidance may include, if the user has not selected a route, providing route guidance related to the emotion route corresponding to the emotion information using the stored preferred route information.

Obtaining the information about the user's emotion may include obtaining information about the user's emotion in real time during the route guidance and determining whether there is a change in the user's emotion.

Calculating the emotion route information may include, if there is a change in the user's emotion, calculating new emotion route information again using the emotion information and the map information.

Providing the route guidance may include, if there is a change in the user's emotion, providing the user with the emotion routes included in the calculated new emotion route information and determining whether the user has selected the route again.

Providing the route guidance may include, if the user has selected the route again, providing route guidance related to the emotion route corresponding to the reselected route and storing the emotion route and the emotion information in a pair as the preferred route information.

Providing the route guidance may include, if the user has not selected the route again, providing route guidance related to the emotion route corresponding to the emotion information using the previously stored preferred route information.

Providing the route guidance may include providing the user with one or more of audio, video, and lighting corresponding to the emotion information while providing the route guidance.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
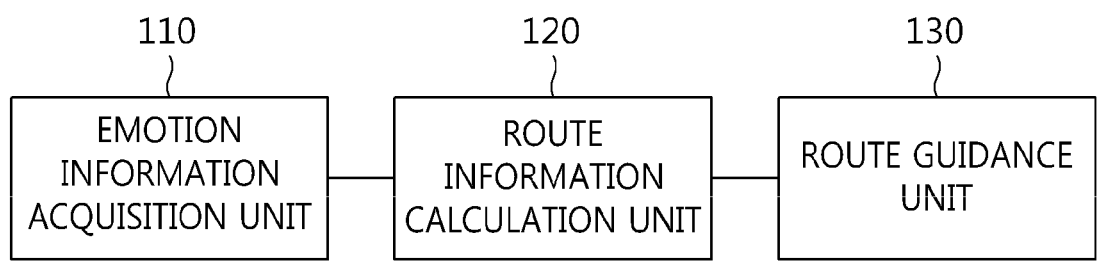
FIG. 1 is a block diagram illustrating an apparatus for providing route guidance based on emotion according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

FIG. 1 is a block diagram illustrating an apparatus for providing route guidance based on emotion according to an embodiment of the present invention.

Referring to FIG. 1, the apparatus for providing route guidance based on emotion according to this embodiment of the present invention includes an emotion information acquisition unit 110, a route information calculation unit 120, and a route guidance unit 130.

The emotion information acquisition unit 110 obtains information about a user's emotion using an emotion acquisition sensor 210.

The emotion acquisition sensor 210 may include a bio signal sensor 211, a voice signal sensor 212, a video signal sensor 213, and an environmental signal sensor 214.

The emotion acquisition sensor 210 may be a sensor that is held by the user.

For example, the emotion acquisition sensor 210 may be a sensor that is included in a portable device 220 that is owned by the user.

For example, the emotion acquisition sensor 210 may be a sensor that is included in one or more of a wristband, necklace and earrings of a user.

The emotion acquisition sensor 220 may be a sensor that is included in a vehicle 230 in which the user has ridden.

For example, the emotion acquisition sensor 220 may be a sensor that is included in one or more of the steering wheel, driver's seat, passenger seat, transmission, ceiling and windshield of the vehicle 230.

The emotion information acquisition unit 110 may include a sensor signal collection unit 201, and a sensor signal analysis unit 202.

The sensor signal collection unit 201 may collect a sensor signal from the emotion acquisition sensor 210.

The sensor signal analysis unit 202 may obtain emotion information by analyzing the collected sensor signal.

The sensor signal analysis unit 202 may obtain the emotion information by performing an emotion convergence cognition algorithm.

The emotion information may include one or more of calmness, tiredness, pain, pleasantness, unpleasantness, fear, and strain.

The emotion information acquisition unit 110 may determine whether there is a change in the user's emotion by obtaining information about the user's emotion in real time during route guidance.

The route information calculation unit 120 calculates emotion route information using the obtained emotion information and map information.

The map information may include one or more of road pavement information, traffic congestion information, and convenience facility information.

The map information may include one or more of famous restaurant information, seasonal specialty information, and tourism information.

The route information calculation unit 120 may calculate new emotion route information using the emotion information and the map information if there is a change in the user's emotion.

The route guidance unit 130 provides route guidance to the user using the calculated emotion route information.

The route guidance unit 130 may provide the user with emotion routes that are included in the emotion route information and check whether the user has selected a route.

If the user has selected a route, the route guidance unit 130 may provide route guidance related to the emotion route corresponding to the selected route, and may store the emotion route and the emotion information in a pair as preferred route information.

If the user has not selected a route, the route guidance unit 130 may provide route guidance related to the emotion route corresponding to the emotion information using previously stored preferred route information.

As described above, the apparatus for providing route guidance based on emotion according to this embodiment of the present invention updates preferred route information if the user has selected a route, and provides route guidance related to a preferred route if the user has not selected a route, thereby compiling statistical information about preferred routes based on the user's emotion and then providing user-tailored route guidance.

If there is a change in the user's emotion, the route guidance unit 130 may provide the user with emotion routes included in the calculated new emotion route information again, and may check whether the user has selected a route again.

If the user has selected the route again, the route guidance unit 130 may provide route guidance related to the emotion route corresponding to the reselected route, and may store the emotion route and the emotion information in a pair as the preferred route information.

If the user does not select the route again, the route guidance unit 130 may provide route guidance related to the emotion route corresponding to the emotion information using previously stored preferred route information.

As described above, if there is a change in the user's emotion during route guidance, the apparatus for providing route guidance based on emotion according to this embodiment of the present invention can provide route guidance tailored to the user's emotion by providing route guidance corresponding to the change in emotion.

The route guidance unit 130 may provide the user with one or more of audio, video, and lighting corresponding to the emotion information while providing the user with the route guidance.

As described above, the apparatus for providing route guidance based on emotion according to this embodiment of the present invention can provide one or more of audio, video, and lighting corresponding to the emotion information while providing route guidance to the user, thereby performing route guidance that helps to improve the user's emotion, together with route guidance that has been tailored to the user's emotion.

Figure 2:
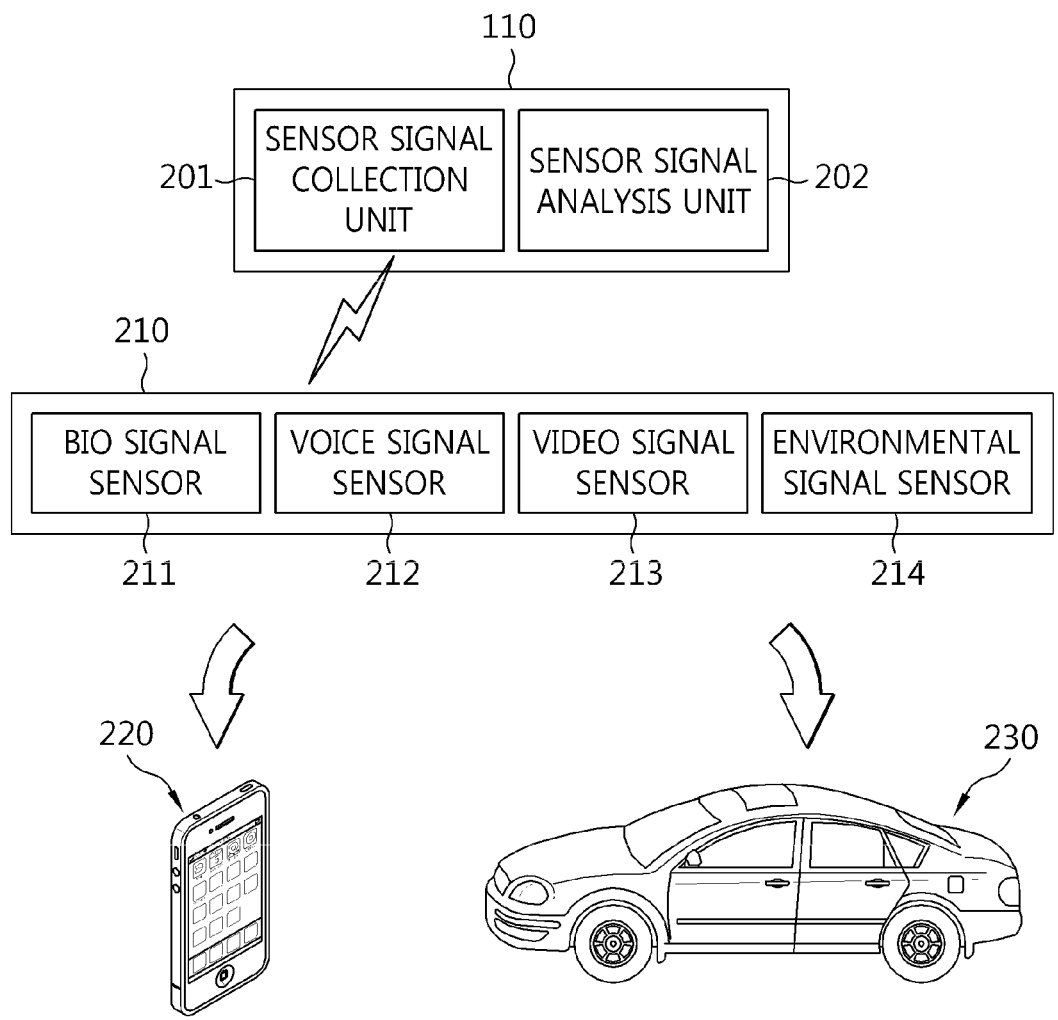
FIG. 2 is a diagram illustrating an example of an emotion information acquisition unit according to an embodiment of the present invention.

FIG. 2 is a diagram illustrating an example of the emotion information acquisition unit 110 according to the present invention.

Referring to FIG. 2, the emotion information acquisition unit 110 according to an embodiment of the present invention includes the sensor signal collection unit 201, and the sensor signal analysis unit 202.

The sensor signal collection unit 201 may collect a sensor signal from the emotion acquisition sensor 210.

The emotion acquisition sensor 210 may include the bio signal sensor 211, the voice signal sensor 212, the video signal sensor 213, and the environmental signal sensor 214.

The emotion acquisition sensor 210 may be a sensor that is held by the user.

For example, the emotion acquisition sensor 210 may be a sensor that is included in the portable device 220 that is held by the user.

For example, the emotion acquisition sensor 210 may be a sensor that is included in one or more of a wristband, necklace and earrings of a user.

The emotion acquisition sensor 220 may be a sensor that is included in the vehicle 230 in which the user has ridden.

For example, the emotion acquisition sensor 220 may be a sensor that is included in one or more of the steering wheel, driver's seat, passenger seat, transmission, ceiling, and windshield of the vehicle 230.

The sensor signal analysis unit 202 may obtain the emotion information by analyzing the collected sensor signal.

The sensor signal analysis unit 202 may obtain the emotion information by performing an emotion convergence cognition algorithm.

The emotion information may include one or more of calmness, tiredness, pain, pleasantness, unpleasantness, fear, and strain.

The emotion information acquisition unit 110 may determine whether there is a change in the user's emotion by obtaining information about the user's emotion in real time during the route guidance.

Figure 3:
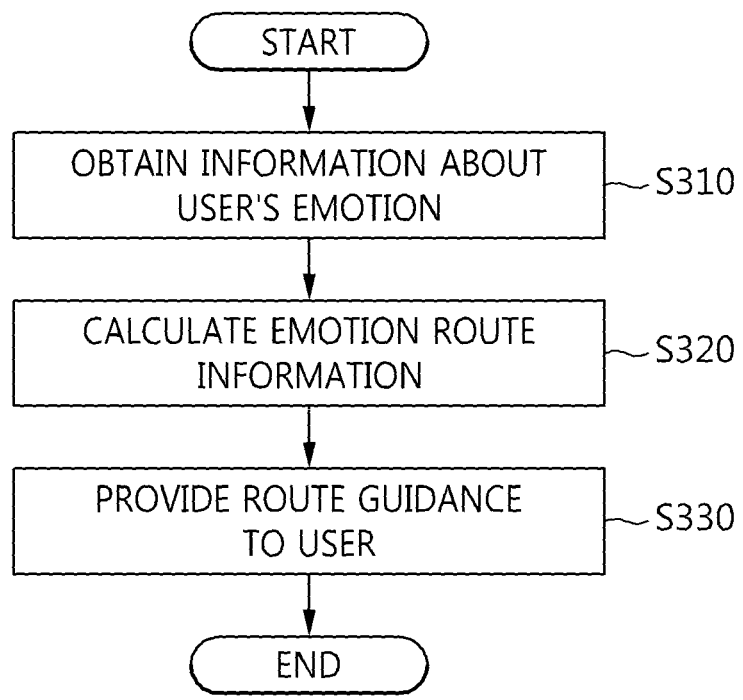
FIG. 3 is a flowchart illustrating a method for providing route guidance based on emotion according to an embodiment of the present invention.

FIG. 3 is a flowchart illustrating a method for providing route guidance based on emotion according to an embodiment of the present invention.

Referring to FIG. 3, in the method for providing route guidance based on emotion according to this embodiment of the present invention, first, information about the user's emotion is obtained using the emotion acquisition sensor 210 at step S310.

The emotion acquisition sensor 210 may include the bio signal sensor 211, the voice signal sensor 212, the video signal sensor 213, and the environmental signal sensor 214.

The emotion acquisition sensor 210 may be a sensor that is held by the user.

For example, the emotion acquisition sensor 210 may be a sensor that is included in the portable device 220 that is held by the user.

For example, the emotion acquisition sensor 210 may be a sensor that is included in one or more of a wristband, necklace and earrings of a user.

The emotion acquisition sensor 220 may be a sensor that is included in the vehicle 230 in which the user has ridden.

For example, the emotion acquisition sensor 220 may be a sensor that is included in one or more of the steering wheel, driver's seat, passenger seat, transmission, ceiling and windshield of the vehicle 230.

Step S310 may include collecting a sensor signal from the emotion acquisition sensor 210 and obtaining the emotion information by analyzing the collected sensor signal.

Obtaining the emotion information by analyzing the collected sensor signal may include obtaining the emotion information by performing an emotion convergence cognition algorithm.

The emotion information may include one or more of calmness, tiredness, pain, pleasantness, unpleasantness, fear, and strain.

At step S310, whether there is a change in the user's emotion may be determined by obtaining information about the user's emotion in real time during the route guidance.

The method for providing route guidance based on emotion according to this embodiment of the present invention further includes calculating emotion route information using the obtained emotion information and map information at step S320.

The map information may include one or more of road pavement information, traffic congestion information, and convenience facility information.

The map information may include one or more of famous restaurant information, seasonal specialty information, and tourism information.

At step S320, if there is a change in the user's emotion, new emotion route information may be calculated using the emotion information and the map information.

The method for providing route guidance based on emotion according to this embodiment of the present invention further includes providing route guidance to the user using the calculated emotion route information at step S330.

At step S330, emotion routes included in the emotion route information may be provided to the user, and whether the user selects the emotion route can be checked.

At step S330, if the user has selected a route, route guidance related to the emotion route corresponding to the selected route may be provided, and the emotion route and the emotion information may be stored in a pair as preferred route information.

At step S330, if the user does not select the route, route guidance related to the emotion route corresponding to the emotion information may be provided using previously stored preferred route information.

As described above, the method for providing route guidance based on emotion according to this embodiment of the present invention is configured to update preferred route information if the user has selected a route and to provide route guidance related to a preferred route if the user has not selected a route, thereby establishing statistical information about preferred routes based on the user's emotion and then providing user-tailored route guidance.

At step S330, if there is a change in the user's emotion, the emotion routes that are included in the calculated new emotion route information may be provided to the user, and whether the user has selected the route again may be checked.

At step S330, if the user has selected the route again, route guidance related to the emotion route corresponding to the reselected route may be provided, and the emotion route and the emotion information may be stored in a pair as preferred route information.

At step S330, if the route is not selected again, route guidance related to the emotion route corresponding to the emotion information may be provided using previously stored preferred route information.

As described above, the method for providing route guidance based on emotion according to this embodiment of the present invention is configured to, if there is a change in the user's emotion during route guidance, provide route guidance corresponding to the change in the user's emotion, thereby performing route guidance that has been tailored to the user's emotion.

At step S330, one or more of audio, video, and lighting corresponding to the emotion information may be provided while the route guidance is being provided to the user.

As described above, the method for providing route guidance based on emotion according to this embodiment of the present invention is configured to provide one or more of audio, video and lighting corresponding to emotion information while providing route guidance to the user, thereby performing route guidance that helps to improve the user's emotion, together with route guidance that has been tailored to the user's emotion.

Figure 4:
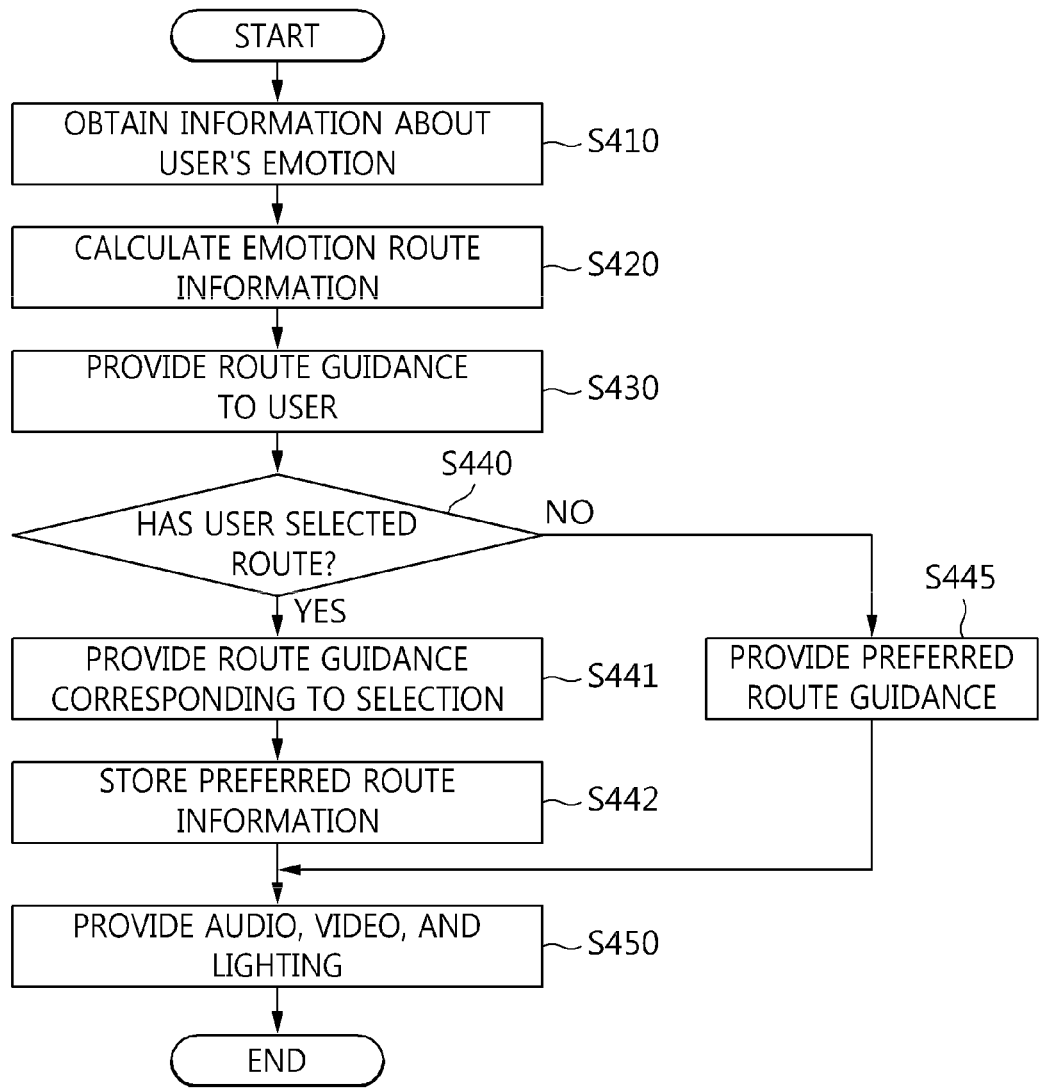
FIG. 4 is a flowchart illustrating an example of a method for providing route guidance based on emotion when a user has selected a route according to an embodiment of the present invention.

FIG. 4 is a flowchart illustrating an example of a method for providing route guidance based on emotion when a user has selected a route according to an embodiment of the present invention.

Referring to FIG. 4, in the method for providing route guidance based on emotion when a user has selected a route according to this embodiment of the present invention, first, information about a user's emotion is obtained using the emotion acquisition sensor 210 at step S410.

The emotion acquisition sensor 210 may include the bio signal sensor 211, the voice signal sensor 212, the video signal sensor 213, and the environmental signal sensor 214.

The emotion acquisition sensor 210 may be a sensor that is held by a user.

For example, the emotion acquisition sensor 210 may be a sensor that is included in the portable device 220 that is held by the user.

For example, the emotion acquisition sensor 210 may be a sensor that is included in one or more of a wristband, necklace and earrings of a user.

The emotion acquisition sensor 220 may be a sensor that is included in the vehicle 230 in which the user has ridden.

For example, the emotion acquisition sensor 220 may be a sensor that is included in one or more of the steering wheel, driver's seat, passenger seat, transmission, ceiling, and windshield of the vehicle 230.

Step S410 may include collecting a sensor signal from the emotion acquisition sensor 210 and obtaining the emotion information by analyzing the collected sensor signal.

Obtaining the emotion information by analyzing the collected sensor signal may include obtaining the emotion information by performing an emotion convergence cognition algorithm.

The emotion information may include one or more of calmness, tiredness, pain, pleasantness, unpleasantness, fear, and strain.

The method for providing route guidance based on emotion according to this embodiment of the present invention further includes calculating emotion route information using the obtained emotion information and map information at step S420.

The map information may include one or more of road pavement information, traffic congestion information, and convenience facility information.

The map information may include one or more of famous restaurant information, seasonal specialty information, and tourism information.

The method for providing route guidance based on emotion according to this embodiment of the present invention further includes providing route guidance to the user using the calculated emotion route information at step S430.

The method for providing route guidance based on emotion when a user has selected a route according to the present invention further includes checking whether the user has selected a route at step S440.

The method for providing route guidance based on emotion according to an embodiment of the present invention further includes providing route guidance related to the emotion route corresponding to the selected route if the user has selected a route at step S441.

The method for providing route guidance based on emotion when a user has selected a route according to this embodiment of the present invention further includes storing the emotion route and the emotion information in a pair as preferred route information if the route is selected at step S442.

The method for providing route guidance based on emotion according to this embodiment of the present invention further includes providing route guidance related to the emotion route corresponding to the emotion information using previously stored preferred route information if the user has not selected a route at step S445.

The method for providing route guidance based on emotion when a user has selected a route according to this embodiment of the present invention further includes providing one or more of audio, video, and lighting corresponding to the emotion information while providing the route guidance to the user at step S450.

As described above, the method for providing route guidance based on emotion when a user has selected a route according to the present invention is configured to update preferred route information if a user has selected a route and to provide route guidance related to a preferred route if the user has not selected a route, thereby compiling statistical information about preferred routes based on a user's emotion and then providing user-tailored route guidance.

Furthermore, the method for providing route guidance based on emotion when a user has selected a route according to this embodiment of the present invention is configured to provide one or more of audio, video, and lighting corresponding to emotion information while providing route guidance to the user, thereby performing route guidance that helps to improve a user's emotion, together with route guidance that has been tailored to the user's emotion.

Figure 5:
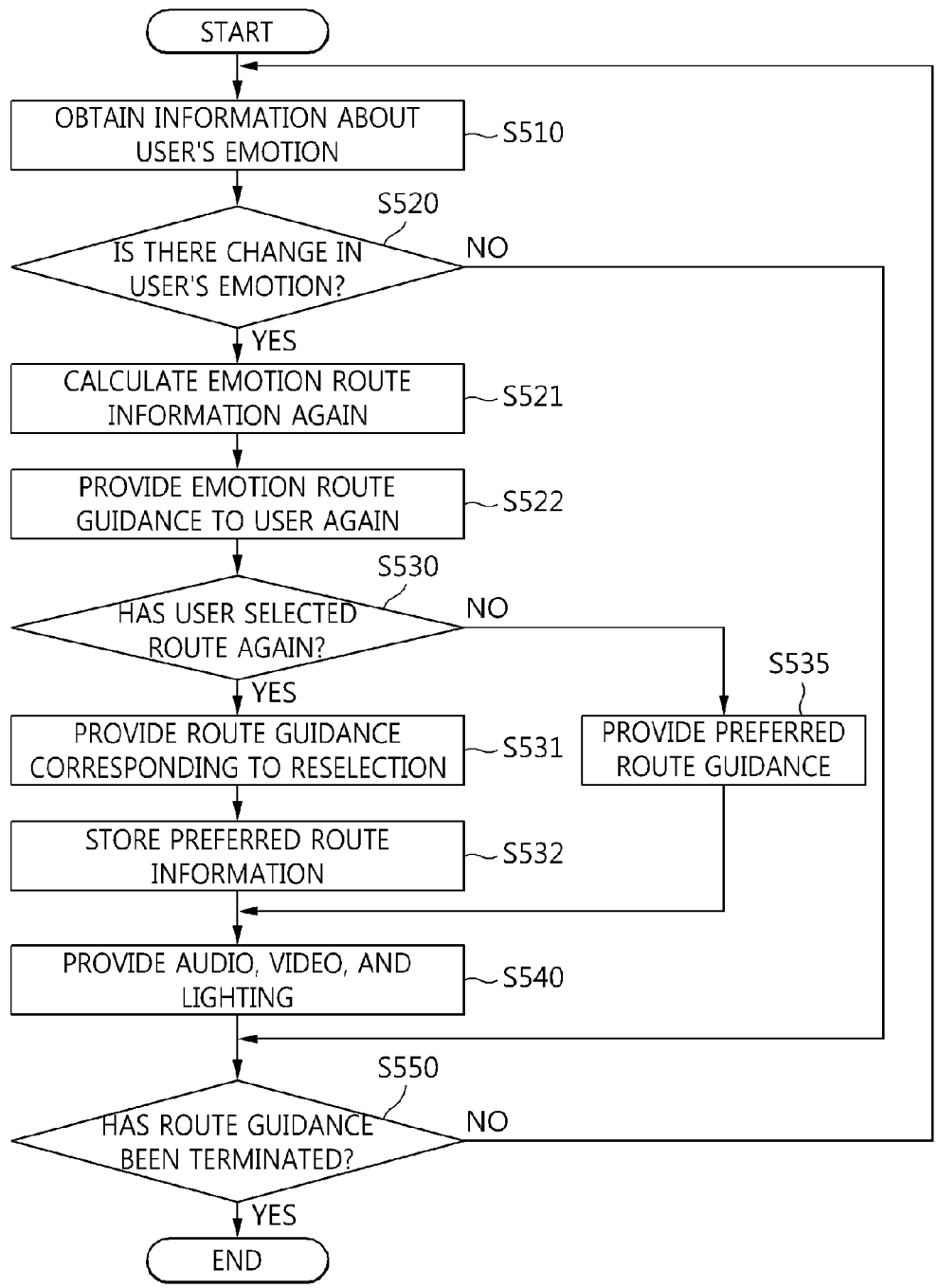
FIG. 5 is a flowchart illustrating an example of a method for providing route guidance based on emotion when there is a change in a user's emotion according to an embodiment of the present invention.

FIG. 5 is a flowchart illustrating an example of a method for providing route guidance based on emotion when there is a change in a user's emotion according to an embodiment of the present invention.

Referring to FIG. 5, in the method for providing route guidance based on emotion when there is a change in a user's emotion according to the present invention, information about a user's emotion is obtained in real time using the emotion acquisition sensor 210 during route guidance at step S510.

The emotion acquisition sensor 210 may include the bio signal sensor 211, the voice signal sensor 212, the video signal sensor 213, and the environmental signal sensor 214.

The emotion acquisition sensor 210 may be a sensor that is held by the user.

For example, the emotion acquisition sensor 210 may be a sensor that is included in the portable device 220 that is held by the user.

For example, the emotion acquisition sensor 210 may be a sensor included in one or more of a wristband, necklace and earrings of a user.

The emotion acquisition sensor 220 may be a sensor that is included in the vehicle 230 in which the user has ridden.

For example, the emotion acquisition sensor 220 may be a sensor that is included in one or more of the steering wheel, driver's seat, passenger seat, transmission, ceiling, and windshield of the vehicle 230.

Step S510 may include collecting a sensor signal from the emotion acquisition sensor 210 and obtaining the emotion information by analyzing the collected sensor signal.

Obtaining the emotion information by analyzing the collected sensor signal may include obtaining the emotion information by performing an emotion convergence cognition algorithm.

The emotion information may include one or more of calmness, tiredness, pain, pleasantness, unpleasantness, fear, and strain.

The method for providing route guidance based on emotion when there is a change in a user's emotion according to this embodiment of the present invention further includes determining whether there is a change in the user's emotion at step S520.

If there is a change in the user's emotion, the method for providing route guidance based on emotion when there is a change in a user's emotion according to this embodiment of the present invention further includes calculating new emotion route information using the emotion information and the map information at step S521.

The map information may include one or more of road pavement information, traffic congestion information, and convenience facility information.

The map information may include one or more of famous restaurant information, seasonal specialty information, and tourism information.

The method for providing route guidance based on emotion when there is a change in a user's emotion according to this embodiment of the present invention further includes providing the user with emotion routes included in the calculated new emotion route information if there is a change in the user's emotion at step S522.

The method for providing route guidance based on emotion when there is a change in a user's emotion according to the present invention further includes checking whether the user has selected the route again at step S530.

The method for providing route guidance based on emotion when there is a change in a user's emotion according to this embodiment of the present invention further includes providing route guidance related to the emotion route corresponding to the reselected route if the user has selected the route again at step S531.

The method for providing route guidance based on emotion when there is a change in a user's emotion according to this embodiment of the present invention further includes storing the emotion route and the emotion information in a pair as preferred route information if the user has selected the route again at step S532.

The method for providing route guidance based on emotion when there is a change in a user's emotion according to this embodiment of the present invention further includes providing route guidance related to the emotion route corresponding to the emotion information using previously stored preferred route information if the user does not select the route again at step S535.

The method for providing route guidance based on emotion when there is a change in a user's emotion according to this embodiment of the present invention further includes providing one or more of audio, video, and lighting corresponding to the emotion information while providing the route guidance to the user at step S540.

As described above, the method for providing route guidance based on emotion when there is a change in a user's emotion according to this embodiment of the present invention is configured to provide one or more of audio, video, and lighting corresponding to emotion information while providing route guidance to the user, thereby performing route guidance that helps to improve a user's emotion, together with route guidance that has been tailored to the user's emotion.

The method for providing route guidance based on emotion when there is a change in a user's emotion according to this embodiment of the present invention further includes checking whether the route guidance has been terminated at step S550.

At step S550, if there is no change in the user's emotion, whether the route guidance has been terminated may be checked.

If the route guidance has not been terminated, the process may proceed to step S510.

As described above, the method for providing route guidance based on emotion according to this embodiment of the present invention is configured to, if there is a change in a user's emotion during route guidance, perform route guidance corresponding to the change in emotion, thereby performing route guidance that has been tailored to the user's emotion.

The present invention has the advantage of obtaining information about a user's emotion using an emotion acquisition sensor that is held by the user or included in a vehicle in which the user has ridden and providing the user with an emotion route using the information about the user's emotion, thereby providing route guidance tailored to a user's emotion.

Furthermore, the present invention has the advantage of updating preferred route information if a user has selected a route and providing route guidance related to a preferred route if the user has not selected a route, thereby compiling statistical information about preferred routes based on the user's emotion and then providing user-tailored route guidance.

Furthermore, the present invention has the advantage of performing route guidance corresponding to changed emotion if there is a change in a user's emotion during route guidance, thereby providing route guidance tailored to the user's emotion.

Moreover, the present invention has the advantage of providing audio, video, and lighting corresponding to the user's emotion along with the route guidance, thereby performing route guidance that helps to improve the user's emotion, together with route guidance that has been tailored to the user's emotion.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for providing route guidance based on emotion, comprising:
a processor configured to:
obtain, by an emotion information acquisition unit, information about a user's emotion using an emotion acquisition sensor, wherein the emotion acquisition sensor comprises at least one of a bio signal sensor, a voice signal sensor, a video signal sensor, and an environmental signal sensor;
calculate, by a route information calculation unit, emotion route information using the obtained emotion information and map information;
store the emotion route information and the obtained emotion information in a pair as preferred route information based upon the user selecting a route; and
provide, by a route guidance unit, route guidance to the user using the calculated emotion route information corresponding to the selected route.

2. The apparatus of claim 1, wherein the processor is further configured to provide, by the route guidance unit, the user with emotion routes included in the emotion route information, and checks whether the user has selected a route.

3. The apparatus of claim 2, wherein if the user has not selected a route, the processor is further configured to provide, by the route guidance unit, route guidance related to the emotion route corresponding to the emotion information using the stored preferred route information.

4. The apparatus of claim 1, wherein the processor is further configured to obtain, by the emotion information acquisition unit using an emotion acquisition sensor, information about the user's emotion in real time during the route guidance, and determines whether there is a change in the user's emotion.

5. The apparatus of claim 4, wherein if there is a change in the user's emotion, the processor is further configured to calculate, by the route information calculation unit, new emotion route information again using the emotion information and the map information.

6. The apparatus of claim 5, wherein if there is a change in the user's emotion, the processor is further configured to provide, by the route guidance unit, the user with the emotion routes included in the calculated new emotion route information, and determines whether the user has selected the route again.

7. The apparatus of claim 6, wherein if the user has selected the route again, the processor is further configured to provide, by the route guidance unit, route guidance related to the emotion route corresponding to the reselected route, and stores the emotion route and the emotion information in a pair as the preferred route information.

8. The apparatus of claim 6, wherein if the user has not selected the route again, the processor is further configured to provide, by the route guidance unit, route guidance related to the emotion route corresponding to the emotion information using the previously stored preferred route information.

9. The apparatus of claim 1, wherein the processor is further configured to provide, by the route guidance unit, the user with one or more of audio, video, and lighting corresponding to the emotion information while providing the route guidance.

10. A method for providing route guidance based on emotion, comprising:
   obtaining, via a processor, information about a user's emotion using an emotion acquisition sensor;
   calculating, via the processor, emotion route information using the obtained emotion information and map information;
   storing, via a memory, the emotion route information and the obtained emotion information in a pair as preferred route information based upon the user selecting a route; and
   providing, via the processor, route guidance to the user using the calculated emotion route information corresponding to the selected route.

11. The method of claim 10, wherein providing the route guidance comprises providing the user with emotion routes included in the emotion route information and checking whether the user has selected a route.

12. The method of claim 11, wherein providing the route guidance comprises, if the user has not selected a route, providing route guidance related to the emotion route corresponding to the emotion information using the stored preferred route information.

13. The method of claim 10, wherein obtaining the information about the user's emotion comprises obtaining information about the user's emotion in real time during the route guidance and determining whether there is a change in the user's emotion.

14. The method of claim 13, wherein calculating the emotion route information comprises, if there is a change in the user's emotion, calculating new emotion route information again using the emotion information and the map information.

15. The method of claim 14, wherein providing the route guidance comprises, if there is a change in the user's emotion, providing the user with the emotion routes included in the calculated new emotion route information and determining whether the user has selected the route again.

16. The method of claim 15, wherein providing the route guidance comprises, if the user has selected the route again, providing route guidance related to the emotion route corresponding to the reselected route and storing the emotion route and the emotion information in a pair as the preferred route information.

17. The method of claim 15, wherein providing the route guidance comprises, if the user has not selected the route again, providing route guidance related to the emotion route corresponding to the emotion information using the previously stored preferred route information.

18. The method of claim 10, wherein providing the route guidance comprises providing the user with one or more of audio, video, and lighting corresponding to the emotion information while providing the route guidance.

\* \* \* \* \*